(12) United States Patent
Berger

(10) Patent No.: US 6,732,697 B1
(45) Date of Patent: May 11, 2004

(54) INERTIAL BALANCING SYSTEM FOR INTERNAL COMBUSTION ENGINE

(75) Inventor: Alvin Henry Berger, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/250,041

(22) Filed: May 30, 2003

(51) Int. Cl.[7] .................................................. F02F 7/00
(52) U.S. Cl. ...................................... 123/192.2; 74/603
(58) Field of Search ........................... 123/192.2, 192.1; 74/604

(56) References Cited

U.S. PATENT DOCUMENTS

| | | |
|---|---|---|
| 4,290,395 A | 9/1981 | Sakano et al. |
| 4,688,528 A | 8/1987 | Nivi et al. |
| 4,781,156 A | 11/1988 | Berger et al. |
| 5,131,355 A | 7/1992 | Bukovics et al. |
| 6,263,853 B1 | 7/2001 | Rau |
| 6,397,809 B1 | 6/2002 | Sayama et al. |

*Primary Examiner*—Noah P. Kamen

(57) ABSTRACT

A reciprocating internal combustion engine balancing system includes multiple reciprocating balancers attached to the cylinder block at the front and rear ends of the crankshaft. The balancers are driven by cams integrated with the crankshaft cheeks which reciprocate the balancers at 180 crankshaft degrees out of phase with each other so that the pitching couple associated with an engine such as an inline 5 cylinder engine will be cancelled.

12 Claims, 3 Drawing Sheets

Figure 3
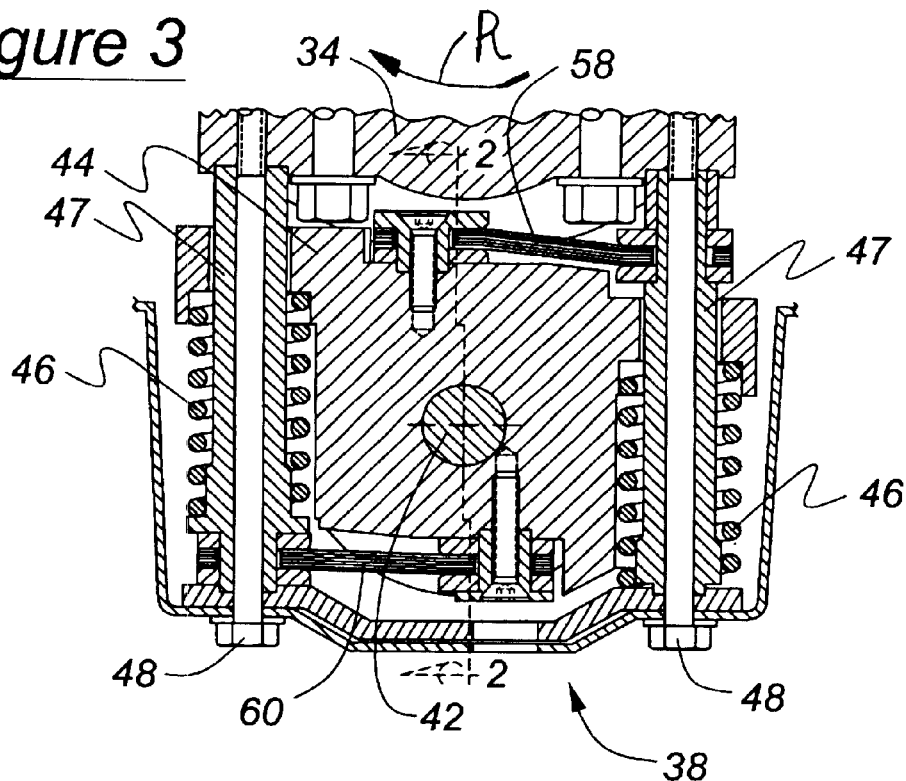
Inherent I-5 Engine Unbalance
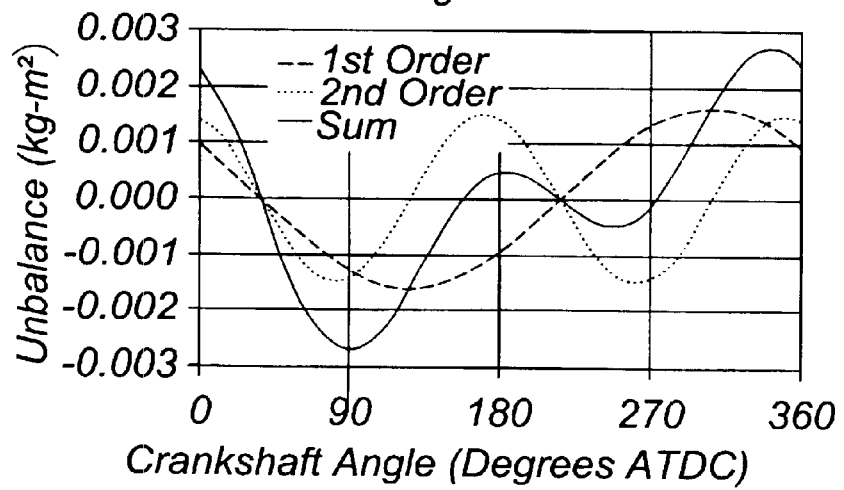
Figure 4

INERTIAL BALANCING SYSTEM FOR INTERNAL COMBUSTION ENGINE

BACKGROUND OF INVENTION

1. Field of the Invention

The present invention relates to an engine balancing system using reciprocating balance masses which are driven directly by cam lobes integrated with the engine's crankshaft. The balance masses are resiliently mounted to the engine's cylinder block under the crankshaft.

2. Disclosure Information

Engine designers have used a veritable plethora of mechanisms and systems to reduce the dynamic unbalance of engines. Such designs have used reciprocating masses such as that shown in U.S. Pat. No. 4,688,528. Another well known method for balancing engines involves the use of rotating balancers. Such balancers suffer from the problem that they do not address the first and second order unbalances in a single assembly. Also, balance shafts typically take a large amount of space are not energy efficient because of the frictional losses associated with them. U.S. Pat. No. 4,781,156, which is assigned to the assignee of the present invention, discloses a crank driven balancing mechanism which is applied at a single location in an engine and which cannot, therefore, address the pitching couple of an engine.

As used herein, the term 'pitching couple' means the tendency of an engine to rotate or, more precisely, rotationally oscillate in a vertical plane aligned along the longitudinal axis of the engine. Inline engines, particularly I4 and I5 engines, can have vertical shaking forces or pitching couples which are due to the accelerations of the pistons and the valvetrain. Inline 5 cylinder engines have been built with balance shafts to cancel either the first order or the second order pitching couples but not both at the same time. In an inline engine, all unbalance caused by piston accelerations is in a vertical plane, resulting in the previously mentioned vertical shake and/or pitching couples. Also, most of the unbalance caused by the accelerations of the valvetrain is also in a vertical plane, resulting in vertical shake or pitching couples. The inventor of the present invention has determined that the use of two reciprocating balancers located near the front and rear regions of the engine will cancel all of the vertical unbalance caused by the piston accelerations and all of the integral order vertical unbalance generated by the valvetrain accelerations. If both of the balancers were to move up and down in phase, they would generate vertical shake. However, when the balancers move up and down out of phase with each other, they generate a pitching couple which counteracts the pitching couples produced by the valvetrain and pistons of the engine. Because the motion of each reciprocating balancer is determined by cam contours which are ground onto the crankshaft cheeks, the contour can be ground to address any and all orders of vibration that are integral numbers greater than or equal to 1.

SUMMARY OF INVENTION

A reciprocating internal combustion engine includes a cylinder block and a crankshaft housed within a cylinder block, with the crankshaft being journaled to the cylinder block by a plurality of main bearings. The crankshaft has a first end and a second end, several crankpins, and cheeks that connect each crankpin to adjacent main bearing journals. A plurality of balancers including reciprocating balance masses is located in the engine, with one of the balancers being attached to the cylinder block near the first and second ends of the crankshaft. Each of the balancers includes a plurality of cam lobes formed on the cheeks of the crankshaft and a reciprocating balancing mass resiliently mounted to the cylinder block below one of the main bearings. The reciprocating balancing masses are preferably spring mounted and they are urged into contact with the cam lobes which are formed on the cheeks of the crankshaft. A plurality of cam followers is in operative contact with the balancing masses and the plurality of cam lobes. At least one of the cam followers is engaged with at least one of each of the cam lobes. Each of the cam followers is operatively connected with one of the reciprocating balancing masses such that the balancing masses will be caused to reciprocate along a generally vertical axis in response to the rotation of the crankshaft and its integral cam lobes.

In a preferred embodiment, two reciprocating balancers operate on an engine, with one of the balancers near the front end of the engine and one near the rear. These two balancers can effectively cancel all integral order inherent unbalance of the engine that is located in the vertical plane of the engine. The motion of each balancer is determined by the contour of the cam surfaces formed on the crankshaft'" cheeks. This motion of each balancer is repeated for each rotation of the crankshaft, but the contour of the cam may be formed to produce motion that is a combination of first, second, and other integral orders of crankshaft rotation. When both balancers are accelerated in the same direction, the reaction against the engine'" structure is a force. When the two balancers are accelerated in opposite directions, the net reaction against the engine'" structure is a couple. If desired, the cams may be contoured such that the balancer masses have a motion that is a composite of various integral orders, both in phase and out of phase with each other, so that forces and couples of all integral orders are cancelled.

According to another aspect of the present invention, a method for balancing the couples generated by the piston acceleration forces of an inline five cylinder reciprocating internal combustion engine having a cylinder block and crankshaft include the steps of providing a plurality of cam lobes upon the crankshaft, with the cam lobes being integrated with cheeks formed on the crankshaft, and providing a plurality of balancing masses which are resiliently mounted to the cylinder block at both ends of the crankshaft. Finally, the present method includes reciprocating the balancing masses with a plurality of cam followers driven by the cam lobes and operatively connected with the balancing masses, with the cam lobes being indexed such that the balancing masses are reciprocated with 180 crankshaft degrees of phase separation.

It is an advantage of the present invention that the present balancing system acts to effectively mitigate engine vibration without increasing to any great extent the package volume of the engine.

It is another advantage of the present invention that the present vibration damping system may be implemented in an engine at a lower cost than known vibration control systems.

It is yet another advantage of the present invention that the present vibration damping system does not rely on any type of chain drive and utilizes lightweight construction.

It is an advantage of the present invention that the present vibration balancing system may be utilized with either inline or v-block engines having various numbers of cylinders.

Other advantages, as well as features and objects of the present invention, will become apparent to the reader of this specification.

BRIEF DESCRIPTION OF DRAWINGS

FIG. 3 is a sectional view of a balancer, partially broken away, according to the present invention taken 90Å° to the view of FIG. 1, along the line 3—3 of FIG. 1, as viewed from the end of engine 10 with clockwise rotation of the crankshaft (in the direction of arrow 'R'), shown.

FIG. 4 illustrates reciprocating piston unbalance inherent in an I-5 engine.

DETAILED DESCRIPTION

Figure 1:
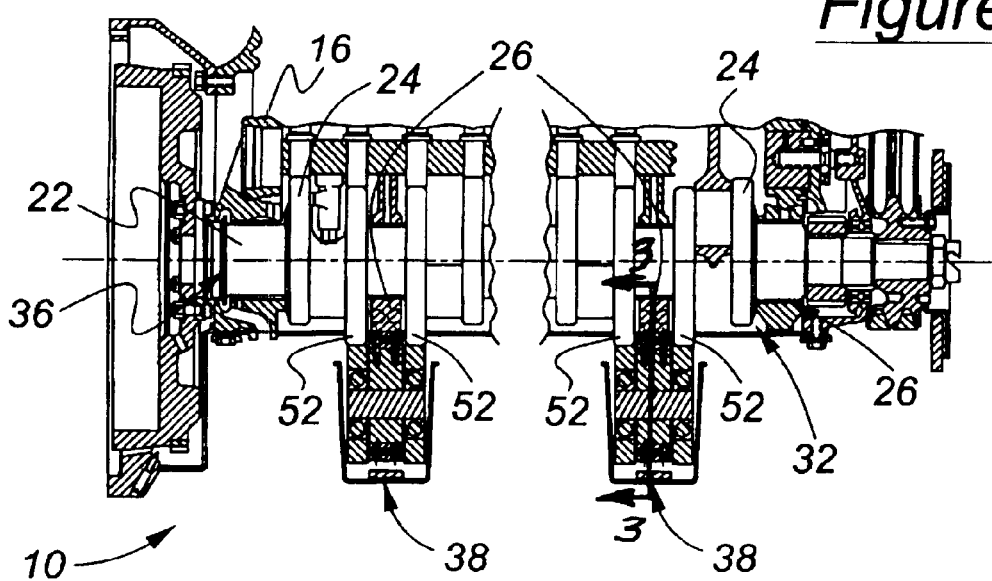
FIG. 1 is a schematic representation of an engine having an inertial balancing system according to the present invention.

As shown in FIG. 1, engine 10 has cylinder block 16 with crankshaft 22 housed within the cylinder block. Crankshaft 22 is journaled to cylinder block 16 by a plurality of main bearings 26. Crankshaft 22 has a first end 32 and a second end 36. Two balancers 38 are mounted, with one balancer being mounted under the first end of the crank 32 and one mounted under the second end 36 of crank 22. It may be further noted in FIG. 1 that cam lobes 52 are formed on crank cheeks 24.

Figure 2:
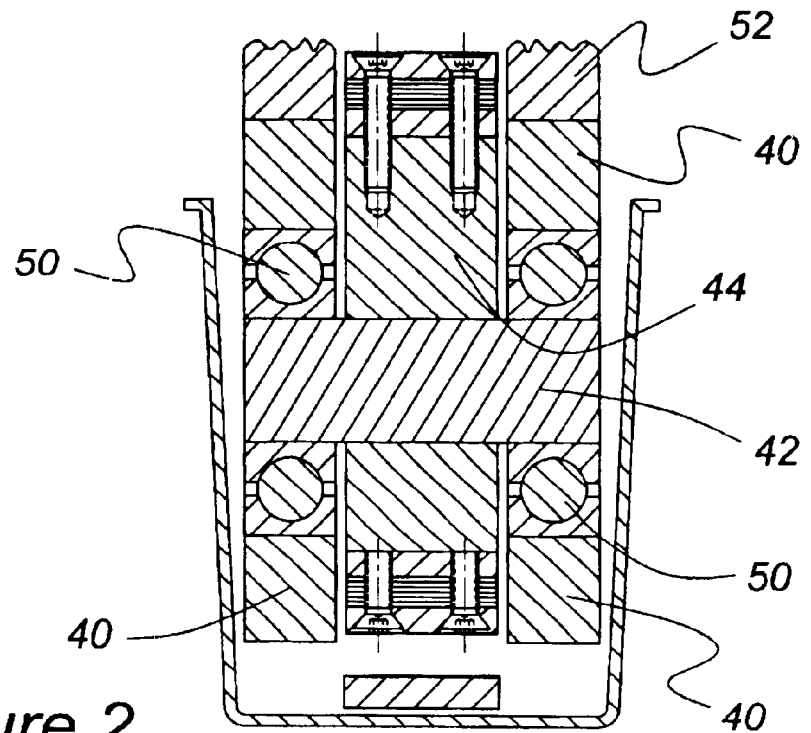
FIG. 2 is a sectional view of a balancing mechanism according to the present invention.

Further details of the present system are shown in FIG. 2. Thus, crankshaft cam lobes 52 are shown as contacting roller followers 40. Cam lobes 52 are approximately circular in configuration, but could have variously profiled, multi-lobed surfaces depending upon the particular needs of an engine with the present invention as being applied. Followers 40 engage cam lobes 52 such that balancing mass 44 will be caused to reciprocate along a generally vertical axis in response to rotation of crankshaft 22 and cam lobes 52. Cam lobes 52 are indexed upon cheeks 24 such that balancing mass 44 mounted at first end 32 of crankshaft 22 will be reciprocated according to a period which is 180 crankshaft degrees out of phase with the period according to which the similar balancing mass 44 located at second end 36 of crankshaft 22 is reciprocated.

Figure 5:
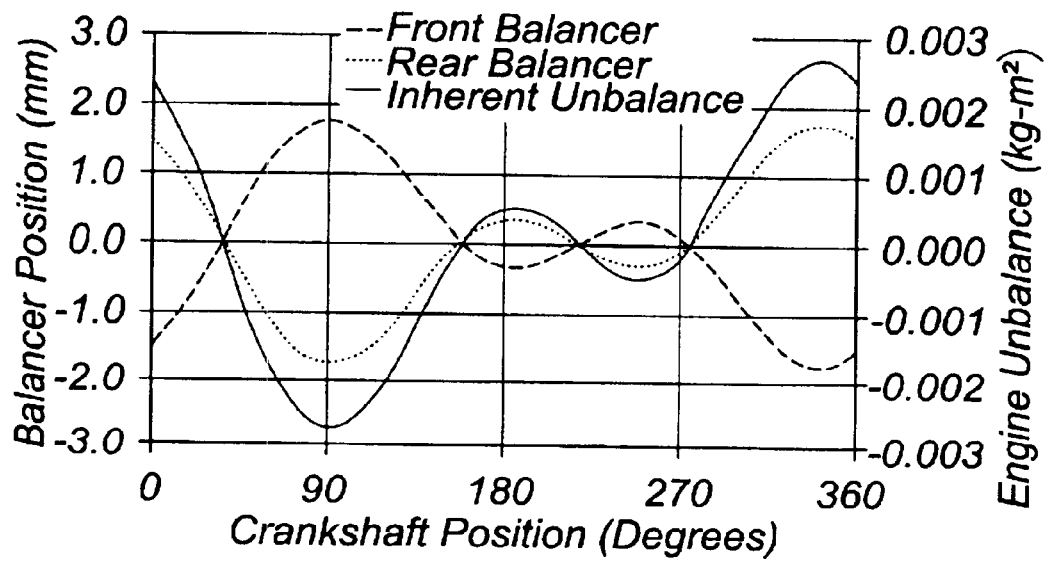
FIG. 5 illustrates balancer motion for a typical engine such as that shown in FIG. 4, sufficient to damp out or compensate for a pitching couple having first and second orders.

FIG. 5 illustrates the motion of a front balancer mounted at first crank end 32, and a rear balancer mounted at second crank end 36. The engine'" inherent unbalance is also depicted. It should be noted that during each complete revolution of the crankshaft, each of the front and rear balance masses is displaced twice during the 360 degrees of crankshaft rotation. The displacements of balancing masses 44 have two different magnitudes. Thus, the displacements occurring between 0 and 180 crankshaft degrees are of much greater magnitude than the displacements occurring generally between 180 and 270 degrees. These disparities exist in the sizes of the displacements because the inherent imbalance is less from 180 to 270 degrees than it is from either 0 degree to 180 degrees or from 270 degrees to 360 degrees.

FIG. 4 shows the inherent engine unbalance due to piston motion for an I-5 engine. The first order unbalance is due to the reciprocating motion of the engine pistons, forced by the changing vertical heights of the crankpins, whereas the second order unbalance is due to the changing vertical components of the connecting rod lengths, caused by the cyclical inclinations of the rods due to the lateral movement of the crankpins. In any event, the first order and second order unbalance may be summed to produce a single curve showing as the sum plot. This is the unbalance for which the present system is intended to compensate.

FIG. 3 shows additional details of the construction of balancer 38 for use with the present system. Thus, balancer 38 is maintained in contact with main bearing cap 34 by means of cap screws 48 and springs 46. The purpose of springs 46 is to allow balancing mass 44 to return to its at rest position, or in other words, to cause followers 40 to be resiliently maintained in contact with cam lobes 52. Balance mass 44 will have reciprocating motion in the vertical direction as crankshaft 22 rotates. To minimize friction and wear, a leaf spring support system was designed to eliminate repetitive sliding contact. Some sliding contact will occur at the end pivots of the leaf spring assemblies to achieve the best alignment of the balancer assembly to the crankshaft, but this motion will not be repeated on each rotation of the crankshaft.

Leaf springs 58 and 60 must have flexibility in bending to allow translation in the vertical direction, while resisting unwanted buckling. This combination of flexibility in bending and twisting with stiffness in buckling is achieved by constructing leaf springs of multiple layers of thin flexible sheets. At each end of the leaf spring assemblies the leaves are clamped together by screws or rivets to heavier stock that is used for mounting the leaf spring assembly to the rest of the balancer assembly.

The balancing mass end of leaf spring 58 is attached rigidly to balancing mass 44, whereas the support end is free to pivot about screw 48. Leaf spring 58 serves to control the alignment of the reciprocating portion of balancer 38 to the cam surfaces 52 of crankshaft 22 in the same manner that a trailer tongue serves to align a two wheel trailer behind an automobile. Leaf spring 58 is flexible in vertical bending and in twisting so that it offers little resistance to the nominal up and down motion of the balancing mass caused by the lift of the cam surfaces and manufacturing tolerances. Leaf spring 58 is also stiff in lateral bending so that any mispositioning of the balancer out of the plane of the two main bearing cap screws 48 causes a steering effect that forces the mechanism into proper alignment in the same manner in which a trailer tends to align itself directly behind the vehicle that is pulling it.

Leaf spring 60 is very similar to leaf spring 58, but it is attached to balancing mass 44 as well as to the support structure, with pivots. In this manner it can exert significant resistance to motion in only one direction, to prevent balancing mass 44 from rotating along with its roller followers 40. Balancing mass 44 fits to the columns 47 at bearing cap screws 48 with adequate clearance to allow normal balancer operation without making sliding contact. However, the clearance is small enough to present the mechanism from "jack-knifing" when the crankshaft is rotated backwards.

As noted above, leaf spring assembly 58 is mounted at the upper end of balancing mass 44, and leaf spring assembly 60 is mounted at the lower end of balancing mass 44. Both leaf spring assemblies should be installed in a slightly bent position such that the bends of the leaf spring assemblies never reverse direction even though the amplitudes of the bends will change. Because there is a small amount of clearance between the pivoting ends of the leaf spring assemblies and the structure to which they are attached, a cyclical reversal of bending direction (and bending stress) would cause motion and wear at the pivoting junctions. A cyclical change in load magnitude, without a reversal of direction would not create as much motion and wear.

FIG. 3 shows balancing mass 44 at its maximum upward position. In this position, upper leaf spring assembly 58 is bent with its balance mass end higher than the support structure end, and the spring is at its maximum curvature. As the balance mass moves to its maximum downward position, upper leaf spring assembly 58 will decrease its curvature but never reach the point of no curvature. In contrast, the lower leaf spring 60 is bent with its balancer end lower than the stationary end. As the balancer moves from its maximum upward position to maximum downward position the lower leaf spring curvature goes from minimum to maximum.

The reason for having opposite curvatures between the upper and the lower leaf spring assemblies is to maximize the space available for balancing mass 44. Because the outer support structure ends of the leaf spring assemblies cannot be moved farther apart from each other in the vertical direction without increasing the overall external dimensions of the balancer assembly, bending the movable, balancer ends, of the leaf spring assemblies apart from each other increases the volume available for installing balancer mass 44.

If it is not necessary to maximize the volume for mounting balancing mass 44, it would be preferable to have both leaf springs bend in the same direction. If both of the leaf spring assemblies were bent with their moving balance mass ends higher than their stationary ends by an equal amount, moving balancer mass 44 in the vertical direction would cause the moveable attachment points of the two leaf spring assemblies to move laterally with equal but opposite magnitudes. The lateral translation of the balancer's centroid would be much less.

Ball bearing assemblies 50 are pressed into followers 40 and onto pivot pin 42. The advantage of this configuration is that each follower 40 can operate at its own speed as dictated by the tolerances in the radius of follower and its mating cam surface. Also, each ball bearing 50 carries the load of only one follower 40, allowing smaller and easier to package bearings.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A reciprocating internal combustion engine, comprising:
    a cylinder block;
    a crankshaft housed within said cylinder block, with said crankshaft being journaled to said cylinder block by a plurality of main bearings, and with said crankshaft having a first end and a second end and integral cheeks; and
    a plurality of reciprocating balancers, with one of said balancers being attached to said cylinder block at the locations of said first and second ends of said crankshaft, and with each of said balancers comprising:
        a plurality of cam lobes formed on said cheeks of said crankshaft;
        a reciprocating balancing mass resiliently mounted to said cylinder block below one of said main bearings;
        a plurality of cam followers in operative contact with said balancing mass and with said plurality of cam lobes, such that said balancing mass will be caused to reciprocate in response to the rotation of said crankshaft and cam lobes.

2. An internal combustion engine according to claim 1, wherein said cam lobes are indexed upon said cheeks such that the balancing mass mounted at the first end of the crankshaft will be caused to reciprocate according to a period which is out of phase with the period according to which the balancing mass mounted at the second end of the crankshaft is caused to reciprocate.

3. An internal combustion engine according to claim 2, wherein said balancing mass mounted at the first end of the crankshaft will be caused to reciprocate according to a period which is 180 crankshaft degrees out of phase with the period according to which the balancing mass mounted at the second end of the crankshaft is caused to reciprocate.

4. An internal combustion engine according to claim 1, wherein each of said reciprocating balancers is driven by two cam lobes located on opposite sides of one of said main bearings.

5. An internal combustion engine according to claim 1, wherein each of said cam lobes is contoured so as to compensate for vibrations occurring not only at the rotational speed of the crankshaft, but also vibrations occurring at twice the rotational speed of the crankshaft.

6. An internal combustion engine according to claim 1, wherein said cam lobes are contoured so as to displace each of said balancing masses twice during each rotation of the crankshaft.

7. An internal combustion engine according to claim 1, wherein said cam lobes are contoured so as to displace each of said balancing masses twice during each rotation of the crankshaft, with said displacements of each balancing mass being of unequal amplitude.

8. An internal combustion engine according to claim 1, wherein said cam lobes are contoured so as to displace each of said balancing masses with a motion that is a composite of various integral orders, both in phase and out of phase with each other, such that the shaking forces and couples of all integral orders are cancelled.

9. A reciprocating internal combustion engine, comprising:
    a cylinder block;
    a crankshaft housed within said cylinder block, with said crankshaft being journaled to said cylinder block by a plurality of main bearings, and with said crankshaft having a first end and a second end and integral cheeks; and
    a plurality of reciprocating balancers, with one of said balancers being attached to said cylinder block beneath main bearings located at the first and second ends of said crankshaft, and with each of said balancers comprising:
        a pair of identically profiled cam lobes formed on said cheeks of said crankshaft;
        a reciprocating balancing mass which is resiliently mounted to said cylinder block and biased by a plurality of coil and leaf springs into contact with said cam lobes;
        a pair of cam followers interposed between said balancing mass and said plurality of cam lobes, with each of said cam followers being engaged with one of said cam lobes, and with each of said cam followers being operatively connected with said balancing mass such that said balancing mass will be caused to reciprocate along a generally vertical axis in response to the rotation of said crankshaft and cam lobes.

10. An internal combustion engine according to claim 9, wherein said cam lobes are indexed upon said cheeks such that the balancing mass mounted at the first end of the crankshaft will be caused to reciprocate according to a period which is 180 crankshaft degrees out of phase with the period according to which the balancing mass mounted at the second end of the crankshaft is caused to reciprocate.

11. An internal combustion engine according to claim 9, wherein each of said pairs of cam lobes is located such that one lobe is positioned on each side of one of said main bearings.

12. A method for balancing a multi cylinder reciprocating internal combustion engine having a cylinder block and crankshaft, comprising the steps of:

provide a plurality of cam lobes upon the crankshaft, with said cam lobes being integrated with cheeks formed on the crankshaft;

providing a plurality of balancing masses which are resiliently mounted to the cylinder block at both ends of the crankshaft; and reciprocating the balancing masses with a plurality of cam followers driven by said cam lobes and operatively connected with said balancing masses, with said cam lobes being indexed such that the balancing masses are reciprocated with 180 crankshaft degrees of phase separation.

\* \* \* \* \*